United States Patent
Leng et al.

(10) Patent No.: US 10,769,774 B2
(45) Date of Patent: Sep. 8, 2020

(54) METHOD AND DEVICE FOR DETECTING A DEFECT IN A STEEL PLATE, AS WELL AS APPARATUS AND SERVER THEREFOR

(71) Applicant: Beijing Baidu Netcom Science and Technology Co., Ltd., Beijing (CN)

(72) Inventors: Jiabing Leng, Beijing (CN); Minghao Liu, Beijing (CN); Yang Liang, Beijing (CN); Yawei Wen, Beijing (CN); Faen Zhang, Beijing (CN); Jiangliang Guo, Beijing (CN); Jin Tang, Beijing (CN); Shiming Yin, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 103 days.

(21) Appl. No.: 16/165,518

(22) Filed: Oct. 19, 2018

(65) Prior Publication Data

US 2019/0213734 A1 Jul. 11, 2019

(30) Foreign Application Priority Data

Jan. 9, 2018 (CN) .......................... 2018 1 0019418

(51) Int. Cl.
*G06T 7/00* (2017.01)
*G06K 9/00* (2006.01)

(52) U.S. Cl.
CPC .............. *G06T 7/0008* (2013.01); *G06K 9/00* (2013.01); *G06T 7/001* (2013.01); *G06T 7/0004* (2013.01);
(Continued)

(58) Field of Classification Search
CPC ................................ G06T 7/008; G06T 7/001
See application file for complete search history.

(56) References Cited

U.S. PATENT DOCUMENTS 6,208,417 B1* 3/2001 Itagaki ................. G01N 21/88
356/237.2
9,170,543 B2 10/2015 Arakawa
(Continued)

FOREIGN PATENT DOCUMENTS

CN 101498458 A 8/2009
CN 101949865 A 1/2011
(Continued)

OTHER PUBLICATIONS

Chinese Search Report dated Jan. 9, 2018, received for corresponding Chinese Application No. 201810020267.5.
(Continued)

*Primary Examiner* — Tuan H Nguyen
(74) *Attorney, Agent, or Firm* — Kinney & Lange, P.A.

(57) ABSTRACT

The application provides a method and a device for detecting a defect in a steel plate, as well as an apparatus and a server therefor. The method for detecting a defect in a steel plate comprises: receiving image data of the steel plate, and generating a defect detection request according to the image data; monitoring computing loads of a plurality of servers, and sending the image data and the defect detection request to a first server; receiving, from the first server, a detection result obtained by calculating the image data using the detection model; and operating according to the detection result, wherein the detection result comprises a selected one of a pass result and a defect result. With the proposed method, the position and the classification of the at least one defect can be obtained, so that the detection accuracy is improved.

18 Claims, 5 Drawing Sheets

(52) U.S. Cl.
CPC ............... *G06T 2207/20081* (2013.01); *G06T 2207/20084* (2013.01); *G06T 2207/30136* (2013.01)

(56) References Cited

U.S. PATENT DOCUMENTS

| | | | |
|---|---|---|---|
| 2004/0206181 | A1 | 10/2004 | Coen et al. |
| 2013/0322733 | A1* | 12/2013 | Tarnowski ............ G06T 7/0004 382/141 |

FOREIGN PATENT DOCUMENTS

| | | |
|---|---|---|
| CN | 101996405 A | 3/2011 |
| CN | 102095731 A | 6/2011 |
| CN | 102252342 A | 11/2011 |
| CN | 102253049 A | 11/2011 |
| CN | 102735689 A | 10/2012 |
| CN | 103399016 A | 11/2013 |
| CN | 104090871 A | 10/2014 |
| CN | 104794491 A | 7/2015 |
| CN | 104850845 A | 8/2015 |
| CN | 104850858 A | 8/2015 |
| CN | 104867144 A | 8/2015 |
| CN | 105118044 A | 12/2015 |
| CN | 105335692 A | 2/2016 |
| CN | 105825175 A | 8/2016 |
| CN | 106153650 A | 11/2016 |
| CN | 106355579 A | 1/2017 |
| CN | 106485324 A | 3/2017 |
| CN | 106529568 A | 3/2017 |
| CN | 106557778 A | 4/2017 |
| CN | 106803074 A | 6/2017 |
| CN | 106845556 A | 6/2017 |
| CN | 107091849 A | 8/2017 |
| CN | 107123114 A | 9/2017 |
| CN | 107133943 A | 9/2017 |
| CN | 107316295 A | 11/2017 |
| CN | 107316300 A | 11/2017 |
| CN | 107328787 A | 11/2017 |
| CN | 107356616 A | 11/2017 |
| CN | 107392896 A | 11/2017 |
| CN | 107403173 A | 11/2017 |
| CN | 107403424 A | 11/2017 |
| CN | 107451997 A | 12/2017 |
| KR | 20160054846 A | 5/2016 |
| WO | 2016168235 A1 | 10/2016 |
| WO | 2016194210 A1 | 12/2016 |

OTHER PUBLICATIONS

First Chinese Office Action dated Oct. 22, 2018, received for corresponding Chinese Application No. 201810031223.2.
Chinese Search Report dated Jan. 9, 2018, received for corresponding Chinese Application No. 201810031223.2.
Chinese Office Action dated Oct. 24, 2018, received for corresponding Chinese Application No. 201810019418.5.
Search Report dated Jan. 9, 2018, received for corresponding Chinese Application No. 201810019418.5.
First Chinese Office Action dated Oct. 19, 2018, received for Chinese Application No. 201810019380.1.
Chinese Search Report dated Jan. 9, 2018, received for Chinese Application No. 201810019380.1.
Supplementary Chinese Search Report dated Jan. 9, 2018, received for Chinese Application No. 201810019380.1.
Wang Yuanyuan et al., Television Technology, 8 pages, vol. 41 No. 3, Mulimodal Graphic Recognition Based on Convolutional Neural Networks.
First Chinese Office Action dated Oct. 22, 2018, received for Chinese Application No. 201810019386.9.
Chinese Search Report dated Jan. 9, 2018, received for Chinese Application No. 201810019386.9.
Supplementary Chinese Search Report dated Jan. 9, 2018, received for Chinese Application No. 201810019386.9.
First Chinese Office Action dated Sep. 10, 2018, received for Chinese Application No. 201810019417.0.
Chinese Search Report dated Jan. 9, 2018, received for Chinese Application No. 201810019417.0.
First Chinese Office Action dated Oct. 24, 2018, received for Chinese Application No. 201810019418.5.
Chinese Search Report dated Jan. 9, 2018, received for Chinese Application No. 201810019418.5.
First Chinese Office Action dated Aug. 28, 2018, received for Chinese Application No. 201810019864.6.
Chinese Search Report dated Jan. 9, 2018, received for Chinese Application No. 201810019864.6.
Zhang Xuelan, Analysis on Image of Paper Defects Based on Machine Vision, Jan. 15, 2014, 83 pages, Chinese Mater's Theses Full-text Database, Engineering Science and Technology I.
Liu Wanjun et al., Learning Performance of Convolutional Neural Networks with Different Pooling Models, Sep. 30, 2016, 13 pages, Journal of Image and Graphics, vol. 21, No. 9.
First Chinese Office Action dated Sep. 14, 2018, received for Chinese Application No. 201810019936.7.
Chinese Search Report dated Jan. 9, 2018, received for Chinese Application No. 201810019936.7.
Second Chinese Office Action dated Dec. 12, 2018, received for Chinese Application No. 201810019936.7.
Second Chinese Search Report dated Jan. 9, 2018, received for Chinese Application No. 201810019936.7.
First Chinese Office Action dated Nov. 30, 2018, received for Chinese Application No. 201810020247.8.
Chinese Search Report dated Jan. 9, 2018, received for Chinese Application No. 201810020247.8.
First Chinese Office Action dated Sep. 6, 2018, received for Chinese Application No. 201810020267.5.

* cited by examiner

METHOD AND DEVICE FOR DETECTING A DEFECT IN A STEEL PLATE, AS WELL AS APPARATUS AND SERVER THEREFOR

CROSS-REFERENCE TO RELATED APPLICATION(S)

The present application claims the benefit of priority to Chinese Patent Application No. 201810019418.5, filed before the State Intellectual Property Office on Jan. 9, 2018, and entitled "METHOD AND DEVICE FOR DETECTING A DEFECT IN A STEEL PLATE, AS WELL AS APPARATUS AND SERVER THEREFOR," which is incorporated in the present application by reference in its entirety.

TECHNICAL FIELD

The present disclosure relates to the field of image processing, and in particular, to a method and a device for detecting a defect in a steel plate, as well as an apparatus and a server therefor.

BACKGROUND

At present, due to the development of computer technology, and particularly of image processing technology, image processing technology comes in to use in more and more fields for facilitating work. In some traditional fields, such as steel manufacturing, image processing technology has also been widely used.

As a widely used material, steel plate is a very important industrial product in the steel industry, and during the production of the steel plate, quality control is undoubtedly a very important part. In the production environment of traditional iron and steel enterprises, an important method of controlling the quality is to test the surface state of a steel plate to determine whether there is a flaw or defect in the steel plate, and to process the steel plate according to the test result. In traditional steel enterprises, there are two main types of quality control systems for detecting a defect: the first one only depends on manual quality control, which relies on industry experts to visually observe the photos of the production environment to give a detecting result; and the second one is manual quality control with machine assistance, which mainly filters out the photos without a defect by the quality control system capable of performing the detection, and then an industry expert detects the photos seemingly with a defect. With the second quality control system, automation in a certain extent may be achieved, and it is possible to determine whether there is a defect in a steel plate according to certain features in an image of the steel plate. However, features and determining rules are based on experience and embedded into a machine, so it is difficult to be upgraded with the development of the business, and as a result, detection accuracy of the system gets lower and lower with the development of the production process, and can even be completely unavailable. The quality control system needs to be modified during an upgrade, which is costly. Moreover, with traditional quality control, it is only possible to detect whether there is a defect in the steel plate and the detection accuracy is low.

SUMMARY

A method and a device for detecting a defect in a steel plate, as well as an apparatus and a server therefor are provided by embodiments of the present disclosure, to at least solve above technical problems in the related art.

In the first aspect, a method for detecting a defect in a steel plate is provided according to embodiments of the present disclosure, including:

receiving image data of the steel plate, and generating a defect detection request according to the image data;

monitoring computing loads of a plurality of servers, and sending the image data and the defect detection request to a first server, wherein each of the plurality of servers is provided with a detection model, and the first server has a lowest load in the plurality of servers;

receiving, from the first server, a detection result obtained by calculating the image data using the detection model; and operating according to the detection result, wherein the detection result comprises a selected one of a pass result and a defect result; and the pass result indicates that the steel plate is qualified, and the defect result indicates at least one defect in the steel plate and comprises a position and a classification of the at least one defect.

In combination with the first aspect, in a first embodiment of the first aspect of the present disclosure, the method further includes: sending an updating instruction to the first server, wherein the updating instruction instructs the first server to update the detection model according to the image data and the detection result, and to send the updated detection model to other servers of the plurality of servers.

According to the second aspect, a method for detecting a defect in a steel plate is provided according to an embodiment of the present disclosure, including:

receiving image data of the steel plate and a defect detection request; and calculating the image data using a detection model according to the defect detection request to obtain and output a detection result, wherein the detection result comprises a selected one of a pass result and a defect result; and the pass result indicates that the steel plate is qualified, and the defect result indicates at least one defect in the steel plate and comprises a position and a classification of the at least one defect.

In combination with the second aspect, in a first embodiment of the second aspect of the present disclosure, the calculating the image data using a detection model to obtain and output a detection result includes:

extracting a steel plate feature from the image data using a deep convolutional neural network;

in a case of determining that there is at least one defect in the steel plate according to the extracted steel plate feature, determining a position and a classification of the at least one defect using a preset classifier, and generating a defect result according to the position and the classification to be the detection result; and in a case of determining that the steel plate is qualified according to the extracted steel plate feature, generating a pass result to be the detection result.

In combination with the first embodiment of the second aspect, before extracting a steel plate feature from the image data using a deep convolutional neural network, the method further includes:

pre-processing the image data;

and the extracting a steel plate feature from the image data using the deep convolutional neural network includes extracting a steel plate feature from the pre-processed image data using a deep convolutional neural network.

In combination with the first embodiment of the second aspect, the steel plate feature is obtained by training through images of a plurality of steel plates, and is updated according to a predetermined time interval or according to an updating instruction, wherein the updating instruction instructs to update the detection model and the steel plate feature according to the image data and the detection result, and the plurality of steel plates are of the same size and formed in the same process.

In combination with the first embodiment of the second aspect, the determining that there is at least one defect in the steel plate according to the extracted steel plate feature includes:

comparing the extracted steel plate feature with a steel plate feature of a qualified steel plate, and determining at least one defect in the steel plate according to a comparison result.

In the third aspect, a device for detecting a defect in a steel plate is provided according to an embodiment of the present disclosure, including:

a data receiving module configured for receiving image data of the steel plate, and generating a defect detection request according to the image data;

a data sending module configured for monitoring computing loads of a plurality of servers, and sending the image data and the defect detection request to a first server, wherein each of the plurality of servers is provided with a detection model, and the first server has a lowest load in the plurality of servers;

a result receiving module configured for receiving, from the first server, a detection result obtained by calculating the image data using the detection model; and an operating module configured for operating according to the detection result, wherein the detection result comprises a selected one of a pass result and a defect result; and the pass result indicates that the steel plate is qualified, and the defect result indicates at least one defect in the steel plate and comprises a position and a classification of the at least one defect.

In the fourth aspect, a device for detecting a defect in a steel plate is provided according to an embodiment of the present disclosure, including:

a receiving module configured for receiving image data of the steel plate and a defect detection request; and a calculating module configured for calculating the image data using a detection model according to the defect detection request to obtain and output a detection result, wherein the detection result comprises a selected one of a pass result and a defect result; and the pass result indicates that the steel plate is qualified, and the defect result indicates at least one defect in the steel plate and comprises a position and a classification of the at least one defect.

In the fifth aspect, an apparatus is provided according to an embodiment of the present disclosure, including:

one or more processors;

a memory configured to store one or more programs;

a communication interface configured to cause the processor and the memory to communicate with an external apparatus;

when the one or more programs are executed by the one or more processors, the one or more processors are caused to implement the method in above first aspect.

In the sixth aspect, a server is provided according to an embodiment of the present disclosure, including:

one or more processors;

a memory configured to store one or more programs;

a communication interface configured to cause the processor and the memory to communicate with an external apparatus;

when the one or more programs are executed by the one or more processors, the one or more processors are caused to implement the method in above second aspect.

In the seventh aspect, embodiments of the present disclosure provide a computer readable storage medium having a computer program stored thereon that, when executed by a processor, implements the method for detecting a defect in a steel plate in the above first aspect.

In the eighth aspect, embodiments of the present disclosure provide a computer readable storage medium having a computer program stored thereon that, when executed by a processor, implements the method for detecting a defect in a steel plate in the above second aspect.

One or more technical solution of the above technical solutions has the following advantages or benefits: in the embodiments of the present disclosure, the detection model is used to obtain the classification and position of a defect, and the detection result may be more accurate.

The above summary is for the purpose of illustration only and is not intended to be limiting. In addition to the illustrative aspects, embodiments, and features described above, further aspects, embodiments, and features of the present disclosure will be readily apparent from the following descriptions and the accompanying drawings.

BRIEF DESCRIPTION OF THE DRAWINGS

In the drawings, unless otherwise specified, the same reference numerals throughout the drawings represent the same or similar components or elements. The drawings are not necessarily to scale. It is to be understood that these drawings depict only some embodiments in accordance with the present disclosure are not to be considered as limiting the scope of the present disclosure.

DETAILED DESCRIPTION

In the following, only certain exemplary embodiments are briefly described. As one skilled in the art can recognize, the described embodiments may be modified in various different ways, without departing from the spirit or scope of the present disclosure. Accordingly, the drawings and description are to be regarded as essentially exemplary but not limiting.

Figure 1:
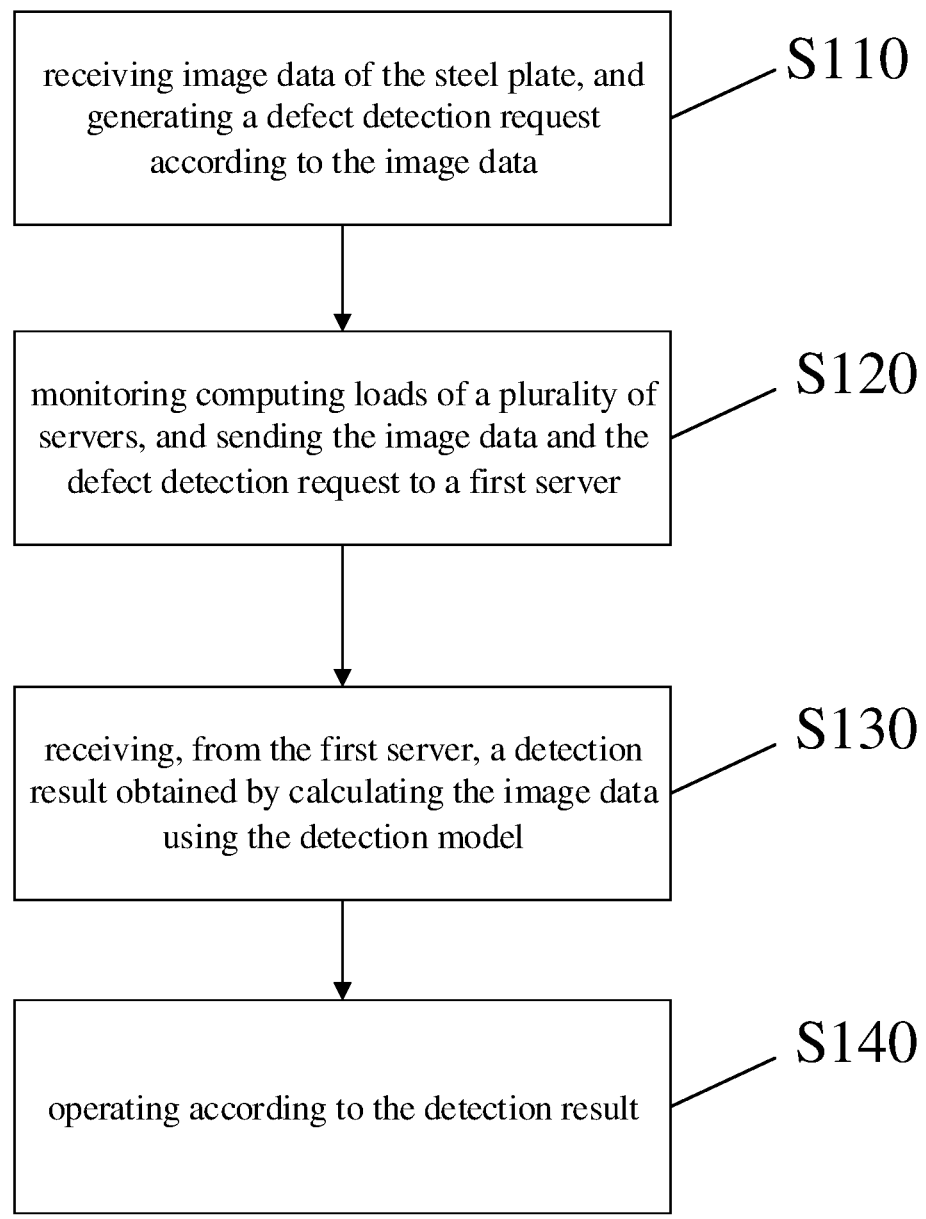
FIG. 1 is a flow chart of the method for detecting a defect in a steel plate according to an embodiment of the present disclosure.

FIG. 1 shows a flow chart of the method 100 for detecting a defect in a steel plate according to an embodiment of the present disclosure. As shown in FIG. 1, the method 100 for detecting a defect in a steel plate may be applied to a first apparatus, and comprise:

S110, receiving image data of the steel plate, and generating a defect detection request according to the image data;

Nowadays, the steel plate may be produced automatically. In order to monitor the quality of the steel plate, cameras are installed in a production hall, and the cameras may take images of the steel plates continuously. In a preferred embodiment of the present disclosure, the camera may be a high-speed camera. The high-speed camera may take dynamic images at very high frequencies, and take a plurality of images of the steel plate on the production line, thus covering various positions of the steel plate. In embodiments of the present disclosure, more accurate detection result of the steel plate may be obtained.

In a preferred embodiment of the present disclosure, the image acquired by the camera may firstly be converted into a signal and is transmitted to a control circuit in the production line. The control circuit may resolve the signal after receiving the signal for subsequent processing. However, it is understood that preferably, the image may be directly received by the first apparatus from the camera without being relayed by the control circuit, which is not limited in the present disclosure. In particular, the first apparatus may be a dedicated server for coordinating apparatuses in the quality control system to achieve a load balance.

In an embodiment of the present disclosure, after receiving an image of the steel plate to be detected, a defect detection request is generated according to the image. In a preferred embodiment of the present disclosure, the defect detection request may include image data of the steel plate.

S120: monitoring computing loads of a plurality of servers, and sending the image data and the defect detection request to a first server, wherein each of the plurality of servers is provided with a detection model, and the first server has a lowest load in the plurality of servers;

It is understood that the number of the images of the steel plate produced on the steel plate production line may be very large and requires a plurality of servers for processing. In this case, the detecting of a defect may be performed by a plurality of servers. Further, each server may have a large amount of data to be processed at the same time. At this time, the computing load of each server may be monitored, and the server with the lowest computing load may be selected for defect detection, thereby improving the detection speed.

S130: receiving, from the first server, a detection result obtained by calculating the image data using the detection model;

S140: operating according to the detection result.

In order to make it easier for production personnel to monitor the production of steel plates, if the detection result is a pass result indicating that the steel plate is qualified, the detection result may be recorded. If the detection result is a defect result, the production personnel will be notified. In particular, the defect result indicates at least one defect in the steel plate and comprises a position and a classification of the at least one defect, and the position and the classification may be displayed to the production personnel for reference.

Figure 2:
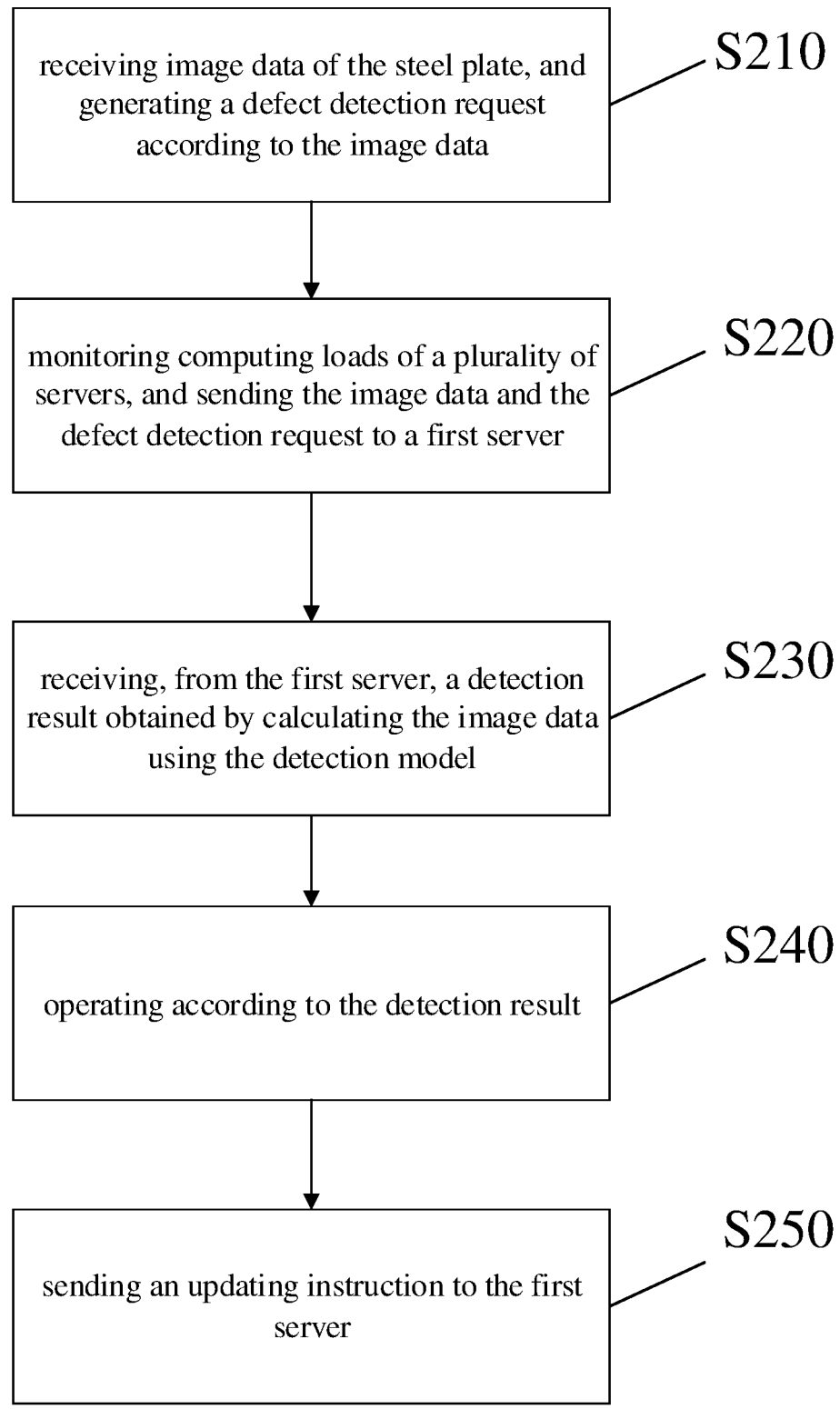
FIG. 2 is a flow chart of the method for detecting a defect in a steel plate according to another embodiment of the present disclosure.

FIG. 2 shows a flow chart of the method 200 for detecting a defect in a steel plate according to another embodiment of the present disclosure. The method 200 differs from the method 100 in that the method 200 may further comprise:

S250: sending an updating instruction to the first server, wherein the updating instruction instructs the first server to update the detection model according to the image data and the detection result, and to send the updated detection model to other servers of the plurality of servers.

According to the method for detecting a defect in a steel plate provided by the method 200, the detection model installed in the plurality of servers may be updated after performing the detection each time, and then the detection result obtained subsequently may be more accurate.

S210-S240 are identical with S110-S140, and will not be repeated herein.

Figure 3:
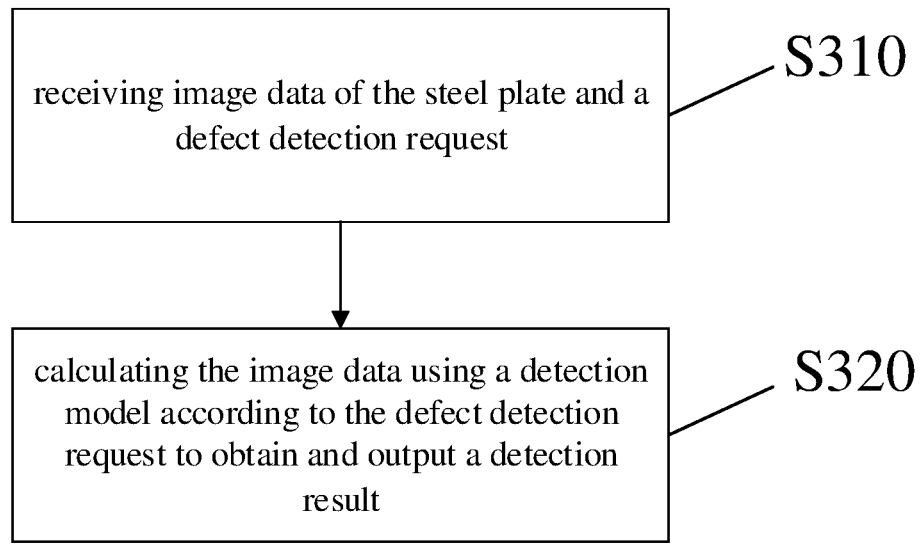
FIG. 3 is a flow chart of the method for detecting a defect in a steel plate according to another embodiment of the present disclosure.

FIG. 3 shows a flow chart of the method 300 for detecting a defect in a steel plate according to another embodiment of the present disclosure. The method 300 may be applied to a first server and may comprise:

S310: receiving image data of the steel plate and a defect detection request;

S320: calculating the image data using a detection model according to the defect detection request to obtain and output a detection result.

Here, the detection result includes a pass result and a defect result. The pass result indicates that the steel plate is qualified, and the defect result indicates at least one defect in the steel plate and includes a position and a classification of the at least one defect.

Figure 4:
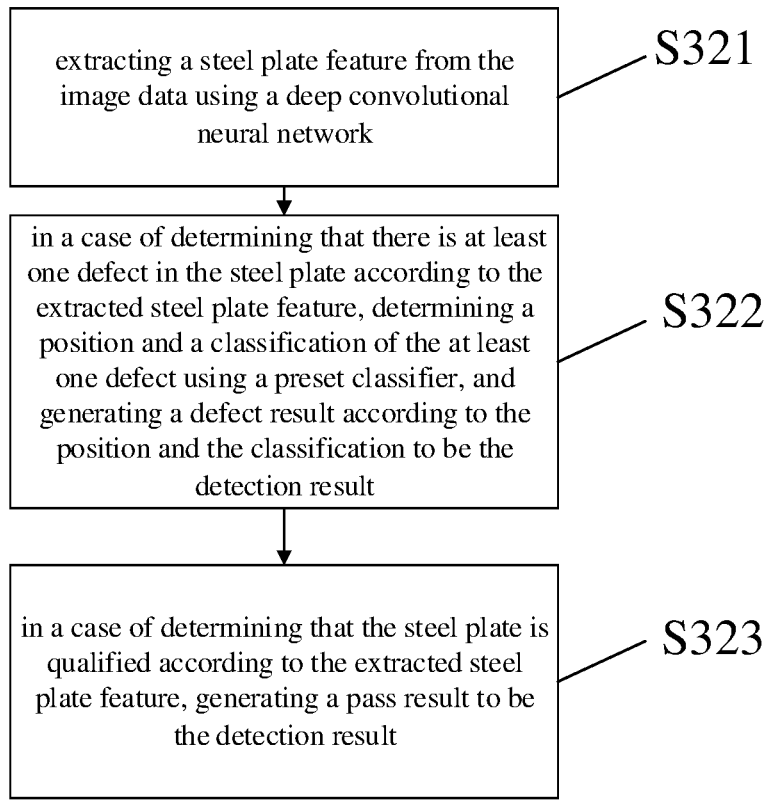
FIG. 4 is a flow chart of the method for obtaining a steel plate feature according to another embodiment of the present disclosure.

In a preferred embodiment of the present disclosure, as shown in FIG. 4, the calculating the image data using a detection model to obtain and output a detection result may include:

S321: extracting a steel plate feature from the image data using a deep convolutional neural network;

The neural network is formed similarly to a human brain, and consists of neurons, each of which is connected to a plurality of other neurons to form a network. A single neuron may only be used to solve simple problems, but may solve more complex problems if the neurons are layered. The Convolutional Neural Network (CNN) is a type of neural network in which upper and lower neurons are connected through "a convolutional kernel". CNN is mainly used for image recognition and is an efficient recognition method. Generally, CNN includes a feature extraction layer and a feature mapping layer.

The deep convolutional neural network incorporates a plurality of structures and is a multi-layer convolutional neural network, often including convolutional layers or Long Short Term Memory (LSTM) units. A deep convolutional neural network may include an input layer, a convolutional layer, a pooled layer, a fully connected layer, etc., each of which may include a plurality of layers of such type as needed. The deep convolutional neural network is more powerful in profiling an image. Therefore, in the embodiments of the present disclosure, the deep convolutional neural network is used to extract a feature of the steel plate, and the accuracy of the detection may thus be further improved. Preferably, the steel plate feature herein may be a feature vector. After the steel plate feature is extracted, step S322 or S323 may be performed.

S322: in a case of determining that there is at least one defect in the steel plate according to the extracted steel plate feature, determining a position and a classification of the at least one defect using a preset classifier, and generating a defect result according to the position and the classification to be the detection result;

In particular, according to a preferred embodiment of the present disclosure, the extracted steel plate feature may be compared with a steel plate feature of a qualified steel plate to determine that there is at least one defect in the steel plate according to the comparison result.

In particular, when classifying defects, the CNN described above may be used. For example, the last pooled layer of CNN may be used as a classifier. However, according to a preferred embodiment of the present disclosure, the preset classifier may be any of Region CNN, Single Shot MultiBox Detector (SSD), Faster RCNN, or You only look once (YOLO) model, and may also be other models, as long as it may be used to perform the defect classifying, which is no limit here.

S323: in a case of determining that the steel plate is qualified according to the extracted steel plate feature, generating a pass result to be the detection result.

In a preferred embodiment of the present disclosure, before extracting a steel plate feature from the image data using a deep convolutional neural network, the method may further include:

pre-processing the image data;

In this case, S321 may include extracting a steel plate feature from the pre-processed image data using a deep convolutional neural network.

It is understood that the image acquired by the camera may include background part unrelated to the steel plate to be detected, such as a part of other apparatuses on the production line, etc. In order to facilitate the defect detection, the image may be pre-processed, for example, the background unrelated to the steel plate to be detected may be removed, leaving only the part of the steel plate to be detected. In addition, in order to facilitate defect detection, the sizes of images acquired may be unified in the pre-processing. For example, the size of the image acquired by the camera may be 1000×500 pixels, and the image may be compressed or expanded to become an image of 600×300 pixels or 1500×750 pixels.

In addition, due to the different specifications of the steel plates, there may be different types of defects, and the image specifications required for defect detection may also be different. The pre-processing of the image may be implemented by any existing art, and is not specifically limited herein.

In a preferred embodiment of the present disclosure, the steel plate feature may be obtained by training images of a plurality of steel plates, and is updated according to a predetermined time interval or according to an updating instruction received preferably from the first apparatus. The updating instruction instructs the first server to update the detection model and the steel plate feature according to the image data of the steel plate and the detection result. Moreover, the plurality of steel plates are of the same size and formed in the same process.

Training is a technique involved in machine learning. Machine learning relates to the science of artificial intelligence, and particularly relates to the research on computer algorithms that may be automatically improved through experience. It may be used to optimize the performance standards of computer programs according to data or prior experience.

In the machine learning technique, a function is usually obtained by learning from a given set of training data. When new data is obtained, a result may be predicted based on this function. In the embodiments of the present disclosure, the training data set may be image data of the plurality of steel plates. It is understood that the plurality of steel plates may include a steel plate with a defect or a steel plate with no defect. It is noted that the steel plate with no defect herein does not mean that the steel plate is completely free of defects, but that steel plate in which the defects are negligible and do not affect use. Moreover, the plurality of steel plates are steel plates of the same size and formed by the same process, because steel plates formed into different specifications or by different processes may contain different types of defects.

In practical applications, the production line of steel plates may be adjusted frequently or upgraded. In this case, the method for detecting defects as used also requires to be updated, otherwise the detection result may be affected.

For example, if the steel plate production line is upgraded, the produced steel plate may have a defect that is more difficult to detect. At this time, if the previous method for detecting defects continues to be used, it is easy to miss such a defect, and the detection result may not be accurate enough. To this end, in the embodiments of the present disclosure, the steel plate feature may be updated according to a predetermined time interval or according to an updating instruction. In this way, the steel plate feature to be extracted may be adjusted frequently, so that the detection result is more accurate. In particular, when special circumstances arise, such as when the production line is upgraded, an updating request may be generated to update the steel plate feature, so that the steel plate produced by the new technology may be detected, and the detection result may be more accurate.

In addition, the steel plates formed by different processes may have different types of defects. For example, for hot rolled plates, types of defects include roll marks, surface inclusions, scales, and the like. And for cold rolled plates, the types of defects include surface inclusions, intervening objects, pores, and interlayers. For galvanized plates, the types of defects include exposed steel (leak plating), zinc layer peeling, and poor zinc flowering. For color coated plates, the types of defects include leak coating, scratching of the paint layer, peeling of the coating, and the like. Therefore, for the production lines of different processes, the steel plate feature obtained here require to be different according to the specifications and forming processes of the steel plates, in order to accurately determine whether there is a defect in the steel plate, and further to determine the position and classification of the defect.

Preferably, the various data obtained during the execution of the methods 100-300, and the obtained detection results, i.e., the position and classification of each defect, may be stored in a predetermined production database. The data in the database may be used to update the steel plate feature, so that the obtained steel plate feature is more targeted, thereby further improving the detection accuracy. In particular, the production database may also be used for other data processing to provide a reference for steel plate production.

Figure 5:
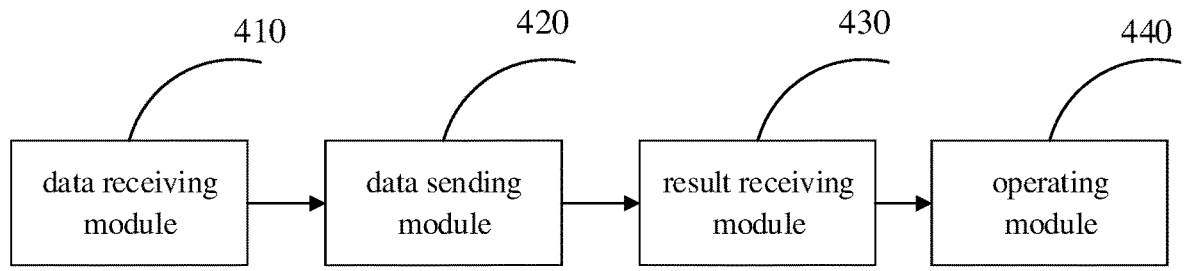
FIG. 5 is a structural view of the device for detecting a defect in a steel plate according to another embodiment of the present disclosure.

FIG. 5 shows a structural view of the device 400 for detecting a defect in a steel plate according to an embodiment of the present disclosure. The device 400 may be applied to a first apparatus and may include:

a data receiving module 410 configured for receiving image data of the steel plate, and generating a defect detection request according to the image data;

a data sending module 420 configured for monitoring computing loads of a plurality of servers, and sending the image data and the defect detection request to a first server, wherein each of the plurality of servers is provided with a detection model, and the first server has a lowest load in the plurality of servers;

a result receiving module 430 configured for receiving, from the first server, a detection result obtained by calculating the image data using the detection model, wherein the detection result comprises a pass result and a defect result; and the pass result indicates that the steel plate is qualified, and the defect result indicates at least one defect in the steel plate and comprises a position and a classification of the at least one defect; and an operating module 440 configured for operating according to the detection result.

Figure 6:
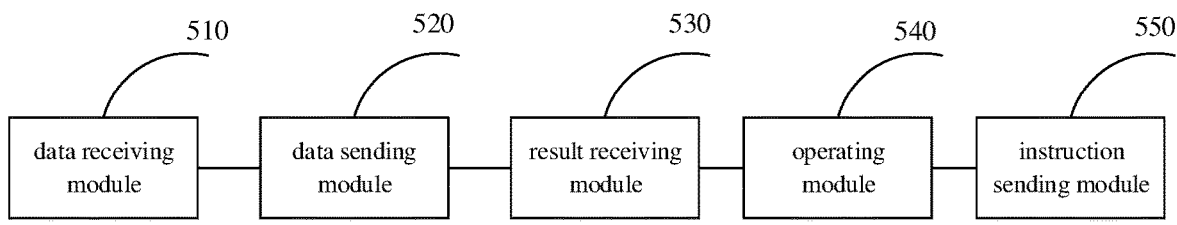
FIG. 6 is a structural view of the device for detecting a defect in a steel plate according to another embodiment of the present disclosure.

In order to update the detection model and improve the detection accuracy, as shown in FIG. 6, a device 500 for detecting a defect in a steel plate may include:

a data receiving module 510 configured for receiving image data of the steel plate, and generating a defect detection request according to the image data;

a data sending module 520 configured for monitoring computing loads of a plurality of servers, and sending the image data and the defect detection request to a first server, wherein each of the plurality of servers is provided with a detection model, and the first server has a lowest load in the plurality of servers;

a result receiving module 530 configured for receiving, from the first server, a detection result obtained by calculating the image data using the detection model, wherein the detection result comprises a pass result and a defect result; and the pass result indicates that the steel plate is qualified, and the defect result indicates at least one defect in the steel plate and comprises a position and a classification of the at least one defect; and an operating module 540 configured for operating according to the detection result.

an instruction sending module 550 configured for sending an updating instruction to the first server, wherein the updating instruction instructs the first server to update the detection model according to the image data and the detection result, and to send the updated detection model to other servers of the plurality of servers.

Figure 7:
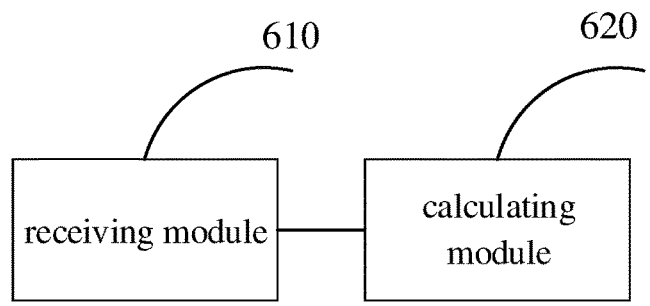
FIG. 7 is a structural view of the device for detecting a defect in a steel plate according to another embodiment of the present disclosure.

FIG. 7 shows a structural view of the device 600 for detecting a defect in a steel plate according to another embodiment of the present disclosure. The device 600 may be applied to a first server and may include:

a receiving module 610 configured for receiving image data of the steel plate and a defect detection request; and a calculating module 620 configured for calculating the image data using a detection model according to the defect detection request to obtain and output a detection result, wherein the detection result comprises a pass result and a defect result; and the pass result indicates that the steel plate is qualified, and the defect result indicates at least one defect in the steel plate and comprises a position and a classification of the at least one defect.

Figure 8:
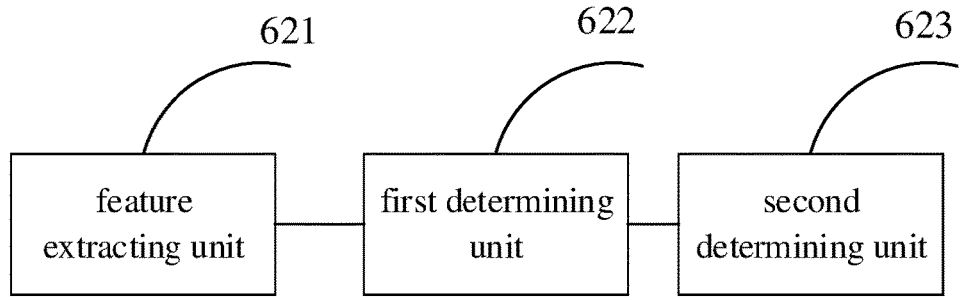
FIG. 8 is a structural view of a calculating module according to another embodiment of the present disclosure.

According to a preferred embodiment of the present disclosure, as shown in FIG. 8, the calculating module 620 may include:

a feature extracting unit 621 configured for extracting a steel plate feature from the image data using a deep convolutional neural network;

Preferably, the steel plate feature is obtained by training using images of a plurality of steel plates, and is updated according to a predetermined time interval or according to an updating instruction received preferably from the first apparatus. Here, the updating instruction instructs the first server to update the detection model and the steel plate feature according to the image data and the calculating result, and the plurality of steel plates are of the same size and formed in the same process.

a first determining unit 622 configured for, in a case of determining that there is at least one defect in the steel plate according to the extracted steel plate feature, determining a position and a classification of the at least one defect using a preset classifier, and generating a defect result according to the position and the classification to be the detection result;

Preferably, the extracted steel plate feature is compared with a steel plate feature of a qualified steel plate to determine that there is at least one defect in the steel plate according to the comparison result.

a second determining unit 623 configured for, in a case of determining that the steel plate is qualified according to the extracted steel plate feature, generating a pass result to be the detection result.

Preferably, the calculating module 620 may further include a pre-processing unit configured for pre-processing the image data.

Here, the feature extracting unit is further configured for extracting a steel plate feature from the pre-processed image data using a deep convolutional neural network.

Figure 9:
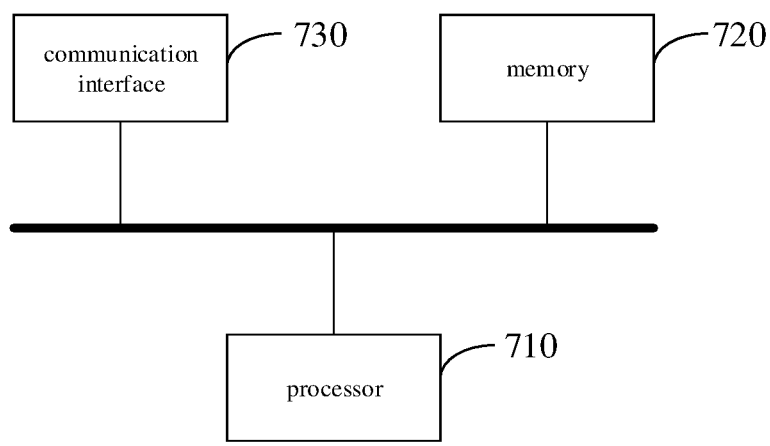
FIG. 9 is a structural view of the apparatus according to another embodiment of the present disclosure.

FIG. 9 shows a structural view of the apparatus according to another embodiment of the present disclosure. As shown in FIG. 9, the apparatus comprises:

one or more processors 710;

a memory 720 configured to store one or more programs;

a communication interface 730 configured to cause the processor 710 and the memory 720 to communicate with an external apparatus;

when the one or more programs are executed by the one or more processors 710, the one or more processors 710 are caused to implement any one of the methods for detecting a defect in a steel plate.

According to another embodiment of the present disclosure, a computer readable storage medium is provided storing a computer program, and the program implements any one of the methods for detecting a defect in a steel plate when being executed by a processor.

In the description of the present specification, the description with reference to the terms "one embodiment", "some embodiments", "example", "specific example", or "some examples" and the like means that specific features, structures, materials, or characteristics described in combination with the embodiments or examples are included in at least one embodiment or example of the present disclosure. Furthermore, the particular features, structures, materials, or characteristics described may be combined in a suitable manner in any one or more embodiments or examples. In addition, without contradicting each other, various embodiments or examples described in the specification, as well as features of various embodiments or examples, may be connected and combined by those skilled in the art.

Moreover, terms like "first", "second", are only used for description, and are not to be construed as indicating or implying a relative importance or implicitly indicating the number of technical features indicated. Thus, features defining "first" and "second" may include at least one of the features, either explicitly or implicitly. In the description of the present disclosure, the meaning of "a plurality" is two or more unless specifically and specifically defined otherwise.

Any process or method description in the flowcharts or otherwise described herein may be understood as a module, segment or portion of code representing executable instructions including one or more steps for implementing a particular logical function or process. And the scope of the preferred embodiments of the present disclosure includes additional implementations, in which the functions may be performed in a substantially simultaneous manner or in an opposite order relative to the order shown or discussed depending on the functions involved, which should be understood by those skilled in the art to which the embodiments of the present disclosure pertain.

The logic and/or steps represented in the flowchart or otherwise described herein. e.g., may be considered as an ordered list of executable instructions for implementing logical functions, may be embodied in any computer readable medium for being used by an instruction execution system, device or apparatus (a computer-based system, a system including a processor, or other system that may fetch instructions and execute instructions from an instruction execution system, device, or apparatus), or used in conjunction with these instructions to execute a system, device, or apparatus. For the purposes of this specification, a "computer readable medium" can be any apparatus that can contain, store, communicate, propagate, or transport a program for use in an instruction execution system, device, or apparatus, or in conjunction with such an instruction execution system, device, or apparatus. More specific examples of computer readable medium (non-exhaustive list) include the following: electrical connection (electronic device) with one or more wires, portable computer disk cartridge (magnetic device), random access memory (RAM), read only memory (ROM), erasable editable read only memory (EPROM or Flash memory), fiber optic device, and portable read only memory (CDROM). Additionally, a computer readable medium may even be a paper or other suitable medium on which the program can be printed, because the program can be obtained electronically, for example by optical scanning of paper or other medium, followed by editing, interpretation or, if necessary, processing in other suitable manner, and then storing it in computer memory.

It should be understood that portions of the present disclosure may be implemented in hardware, software, firmware or a combination thereof. In the above-described embodiments, multiple steps or methods may be implemented in software or firmware stored in a memory and executed by a suitable instruction execution system. For example, if implemented in hardware, as in another embodiment, it may be implemented using any one or combination of the following techniques well known in the art: discrete logic circuits with logic gates for implementing logic functions on data signals, application specific integrated circuits with suitable combinational logic gates, programmable gate arrays (PGAs), field programmable gate arrays (FPGAs), and the like.

Those skilled in the art can understand that all or part of the steps carried by the method of implementing the above embodiments may be completed by a program to instruct related hardware, and the program may be stored in a computer readable storage medium. When executed, one or a combination of the steps of the method embodiments is included.

In addition, the functional units in the embodiments of the present disclosure can be integrated in one processing module or each unit may independently physically exist, or two or more units may be integrated into one module. The above integrated module may be implemented in the form of hardware, and can also be implemented in the form of a software functional module. If the integrated modules are implemented in the form of a software functional module and sold or used as an independent product, they can be stored in a computer-readable storage medium. The storage medium may be a read only memory, a magnetic disk or an optical disk, or the like.

What is mentioned above is only the specific implementation of the present disclosure, but does not limit the protection scope of the present disclosure, and anyone skilled in the art may easily think of mortifications and alternations within the technical scope disclosed by the present disclosure, all of which should be contained within the protection scope of the present disclosure. Therefore, the protection scope of the claims shall prevail as the protection scope of the present disclosure.

The invention claimed is:

1. A method for detecting a defect in a steel plate, comprising:
receiving image data of the steel plate, and generating a defect detection request according to the image data;
monitoring computing loads of a plurality of servers, and sending the image data and the defect detection request to a first server, wherein each of the plurality of servers is provided with a detection model, and the first server has a lowest load in the plurality of servers;
receiving, from the first server, a detection result obtained by calculating the image data using the detection model; and
operating according to the detection result,
wherein the detection result comprises a selected one of a pass result and a defect result, wherein the pass result indicates that the steel plate is qualified, and the defect result indicates at least one defect in the steel plate and comprises a position and a classification of the at least one defect, and
wherein calculating the image data using the detection model comprises:
extracting a steel plate feature from the image data using a deep convolutional neural network; and
obtaining the detection result according to the extracted steel plate feature.

2. The method according to claim 1, wherein the method further comprises:
sending an updating instruction to the first server,
wherein the updating instruction instructs the first server to update the detection model according to the image data and the detection result, and to send the updated detection model to other servers of the plurality of servers.

3. An apparatus, comprising:
one or more processors;
a memory configured to store one or more programs; and
a communication interface configured to cause the processor and the memory to communicate with an external apparatus;
wherein when the one or more programs are executed by the one or more processors, the one or more processors are caused to implement the method of claim 1.

4. A non-transitory computer readable storage medium having a computer program stored thereon that, when executed by a processor, implements the method of claim 1.

5. A method for detecting a defect in a steel plate, comprising:
receiving image data of the steel plate and a defect detection request; and
calculating the image data using a detection model according to the defect detection request to obtain and output a detection result,
wherein the detection result comprises a selected one of a pass result and a defect result, wherein the pass result indicates that the steel plate is qualified, and the defect result indicates at least one defect in the steel plate and comprises a position and a classification of the at least one defect, and wherein calculating the image data using a detection model to obtain and output a detection result comprises:
extracting a steel plate feature from the image data using a deep convolutional neural network; and
obtaining the detection result according to the extracted steel plate feature.

6. The method according to claim 5, wherein calculating the image data using a detection model to obtain and output a detection result comprises:
in response to determining that there is at least one defect in the steel plate according to the extracted steel plate feature, determining the position and the classification of the at least one defect using a preset classifier, and generating the defect result according to the position and the classification as the detection result; and
in response to determining that the steel plate is qualified according to the extracted steel plate feature, generating the pass result as the detection result.

7. The method according to claim 6, wherein before extracting a steel plate feature from the image data using a deep convolutional neural network, the method further comprises:
pre-processing the image data; and
wherein extracting the steel plate feature from the image data using the deep convolutional neural network comprises:
extracting the steel plate feature from the pre-processed image data using the deep convolutional neural network.

8. The method according to claim 6, wherein the steel plate feature is obtained by training through images of a plurality of steel plates, and is updated according to a predetermined time interval or according to an updating instruction,
wherein the updating instruction instructs to update the detection model and the steel plate feature according to the image data and the detection result, and the plurality of steel plates are of the same size and formed in the same process.

9. The method according to claim 6, wherein determining that there is at least one defect in the steel plate according to the extracted steel plate feature comprises:
comparing the extracted steel plate feature with a steel plate feature of a qualified steel plate, and determining at least one defect in the steel plate according to a comparison result.

10. A server, comprising:
one or more processors;
a memory configured to store one or more programs; and
a communication interface configured to cause the processor and the memory to communicate with an external apparatus;
wherein when the one or more programs are executed by the one or more processors, the one or more processors are caused to implement the method of claim 5.

11. A non-transitory computer readable storage medium having a computer program stored thereon that, when executed by a processor, implements the method of claim 5.

12. A device for detecting a defect in a steel plate, comprising:
a data receiving module configured for receiving image data of the steel plate, and generating a defect detection request according to the image data;
a data sending module configured for monitoring computing loads of a plurality of servers, and sending the image data and the defect detection request to a first server, wherein each of the plurality of servers is provided with a detection model, and the first server has a lowest load in the plurality of servers;
a result receiving module configured for receiving, from the first server, a detection result obtained by calculating the image data using the detection model; and
an operating module configured for operating according to the detection result,
wherein the detection result comprises a selected one of a pass result and a defect result, wherein the pass result indicates that the steel plate is qualified, and the defect result indicates at least one defect in the steel plate and comprises a position and a classification of the at least one defect, and
wherein calculating the image data using the detection model comprises:
extracting a steel plate feature from the image data using a deep convolutional neural network; and
obtaining the detection result according to the extracted steel plate feature.

13. The device according to claim 12, wherein the device further comprises:
an instruction sending module configured for sending an updating instruction to the first server,
wherein the updating instruction instructs the first server to update the detection model according to the image data and the detection result, and to send the updated detection model to other servers of the plurality of servers.

14. A device for detecting a defect in a steel plate, comprising:
a receiving module configured for receiving image data of the steel plate and a defect detection request; and
a calculating module configured for calculating the image data using a detection model according to the defect detection request to obtain and output a detection result,
wherein the detection result comprises a selected one of a pass result and a defect result, wherein the pass result indicates that the steel plate is qualified, and the defect result indicates at least one defect in the steel plate and comprises a position and a classification of the at least one defect, and
wherein the calculating module comprises:
a feature extracting unit configured for extracting a steel plate feature from the image data using a deep convolutional neural network; and
a determining unit configured to obtain the detection result according to the extracted steel plate feature.

15. The device according to claim 14, wherein the determining unit comprises:
a first determining unit configured to, in response to determining that there is at least one defect in the steel plate according to the extracted steel plate feature, determine the position and the classification of the at least one defect using a preset classifier, and generating the defect result according to the position and the classification as the detection result; and
a second determining unit configured to, in response to determining that the steel plate is qualified according to the extracted steel plate feature, generate the pass result as the detection result.

16. The device according to claim 15, wherein the calculating module further comprises:

a pre-processing unit configured for pre-processing the image data;

and wherein:

the feature extracting unit is further configured for extracting the steel plate feature from the pre-processed image data using the deep convolutional neural network.

17. The device according to claim 15, wherein the steel plate feature is obtained by training through images of a plurality of steel plates, and is updated according to a predetermined time interval or according to an updating instruction, and wherein the updating instruction instructs to update the detection model and the steel plate feature according to the image data and the detection result, and the plurality of steel plates are of the same size and formed in the same process.

18. The device according to claim 15, wherein the first determining unit is further configured for comparing the extracted steel plate feature with a steel plate feature of a qualified steel plate, and determining at least one defect in the steel plate according to a comparison result.

* * * * *